United States Patent
Wei (10) Patent No.: US 9,432,367 B2
(45) Date of Patent: Aug. 30, 2016

(54) PROCESSING METHOD FOR PIECING TOGETHER FINGERPRINT BASED ON MOBILE TERMINAL AND MOBILE TERMINAL

(71) Applicant: HUIZHOU TCL MOBILE COMMUNICATION CO., LTD, HuiZhou, Guangdong (CN)

(72) Inventor: Jinping Wei, Guangdong (CN)

(73) Assignee: Huizhou TCL Mobile Communication Co., Ltd. (CN)

( * ) Notice: Subject to any disclaimer, the term of this patent is extended or adjusted under 35 U.S.C. 154(b) by 0 days.

(21) Appl. No.: 14/439,354

(22) PCT Filed: May 30, 2014

(86) PCT No.: PCT/CN2014/078879
§ 371 (c)(1),
(2) Date: Apr. 29, 2015

(87) PCT Pub. No.: WO2015/106521
PCT Pub. Date: Jul. 23, 2015

(65) Prior Publication Data
US 2015/0350202 A1     Dec. 3, 2015

(30) Foreign Application Priority Data

Jan. 17, 2014   (CN) .......................... 2014 1 002 0908

(51) Int. Cl.
*H04L 29/06*     (2006.01)
*G06F 21/32*     (2013.01)
*H04W 12/06*    (2009.01)
(Continued)

(52) U.S. Cl.
CPC ........... *H04L 63/0861* (2013.01); *G06F 21/32* (2013.01); *H04W 12/06* (2013.01); *H04M 1/67* (2013.01); *H04W 88/02* (2013.01)

(58) Field of Classification Search
CPC ..................................................... G06F 21/32
See application file for complete search history.

(56) References Cited

U.S. PATENT DOCUMENTS 8,181,031 B2    5/2012  Narayanaswami
9,119,539 B1 *  9/2015  Dotan ................ A61B 5/02438
(Continued)

FOREIGN PATENT DOCUMENTS

CA          2754314 A1    4/2012
CN        101150794 A     3/2008
(Continued)

*Primary Examiner* — Jason K Gee
(74) *Attorney, Agent, or Firm* — Roger D. Emerson; Emerson Thomson & Bennett (57) ABSTRACT

A processing method for piecing together a fingerprint based on a mobile terminal and a mobile terminal are disclosed. The method includes: acquiring fingerprint information of a user via a fingerprint multiplexing button; comparing the fingerprint information of the user with fingerprint information which is stored in advance; unlocking the mobile terminal if the fingerprint information of the user matches the fingerprint information which is stored in advance; and locking the mobile terminal and prompting the current operating user to re-input fingerprint information to unlock the mobile terminal if the fingerprint information of the current operating user is inconsistent with the fingerprint information which is stored in advance. When the user utilizes the mobile terminal, a fingerprint match is performed. If different, the mobile terminal is locked for increasing the safety of the information.

11 Claims, 4 Drawing Sheets

(51) Int. Cl.
*H04W 88/02* (2009.01)
*H04M 1/67* (2006.01)

(56) References Cited

U.S. PATENT DOCUMENTS

2005/0113071 A1  5/2005  Nagata
2012/0192254 A1  7/2012  Perez
2013/0308838 A1*  11/2013  Westerman .......... G06K 9/0008
                                                     382/125
2014/0003679 A1*  1/2014  Han .................. G06K 9/00013
                                                     382/124
2014/0366111 A1*  12/2014  Sheller .................. H04L 63/08
                                                     726/7

FOREIGN PATENT DOCUMENTS

| CN | 101796764 | 8/2010 |
| CN | 102611774 U | 7/2012 |
| CN | 102867168 | 1/2013 |
| CN | 202735894 U | 2/2013 |
| CN | 103780736 A | 5/2014 |

* cited by examiner

PROCESSING METHOD FOR PIECING TOGETHER FINGERPRINT BASED ON MOBILE TERMINAL AND MOBILE TERMINAL

BACKGROUND OF THE INVENTION

1. Field of the Invention

The present invention generally relates to a field of mobile terminals, and more particularly to a processing method for piecing together a fingerprint based on a mobile terminal and a mobile terminal.

2. Description of Prior Art

With the development of mobile communication techniques and the constant increasing of people's living standards, various types of mobile terminals, such as mobile phones, are more and more popular. Mobile phones have become indispensable communication tools in people's lives.

With the rapid development of mobile devices, security issues get more and more people's attention. As known to all, everyone's fingerprints are unique. Accordingly, fingerprints have become an effective identification tool. In current applications, the fingerprints are utilized as an unlock password for a mobile phone or as an entry identification of a protected area. However, in some situations, a higher degree of security protection is required. For example, when a host of a mobile phone leaves the mobile phone and forgets to lock the mobile phone or when the host is away, the hidden danger that information is unsafe exists.

In summary, the above-mentioned problems exist in the prior art, and thus it is necessary to increase the safety of a mobile terminal.

DISCLOSURE OF THE INVENTION

1. Technical Problems

The present invention aims to solve technical problems that the above-mentioned deficiencies exist in the prior art by providing a processing method for piecing together a fingerprint based on a mobile terminal and a mobile terminal. A fingerprint identification area is multiplexed with a button area, such that a new function which multiplexes the fingerprint identification area with the button area is added in the mobile terminal. When a user presses the button area which multiplexes with the fingerprint identification area in the process of utilizing the mobile terminal, the fingerprint is read and the fingerprint is matched by the background program. If the match is inconsistent, the mobile terminal is locked for increasing the safety of information.

Solutions to the Problems

Technological Solutions

A processing method for piecing together a fingerprint based on a mobile terminal comprises:

Multiplexing a fingerprint identification area with a button of the mobile terminal to form a fingerprint multiplexing button, and the fingerprint multiplexing button being multiplexed with the finger identification area, wherein the fingerprint multiplexing button is formed by multiplexing a fingerprint sensor in the fingerprint identification area with a home button of the mobile terminal;

Acquiring fingerprint information of a user via the fingerprint multiplexing button;

Comparing the fingerprint information of the user with fingerprint information which is stored in advance;

Unlocking the mobile terminal if the fingerprint information of the user matches the fingerprint information which is stored in advance;

Acquiring fingerprint information of a current operating user via the fingerprint multiplexing button when the current operating user operates the mobile terminal after the mobile terminal is unlocked;

Comparing the fingerprint information of the current operating user with the fingerprint information which is stored in advance;

Locking the mobile terminal and prompting the current operating user to re-input fingerprint information to unlock the mobile terminal if the fingerprint information of the current operating user is inconsistent with the fingerprint information which is stored in advance; and Allowing the current operating user to operate the mobile terminal normally if the fingerprint information of the current operating user matches the fingerprint information which is stored in advance.

In the processing method for piecing together the fingerprint based on the mobile terminal of the present invention, after the step of acquiring the fingerprint information of the current operating user via the fingerprint multiplexing button when the current operating user operates the mobile terminal after the mobile terminal is unlocked, the method comprises:

Acquiring and storing the fingerprint information of the current operating user by operating the fingerprint multiplexing button, wherein the fingerprint information of the current operating user comprises information of fingerprint pieces;

Comparing the fingerprint information of the current operating user with fingerprint information which is stored during a last time, so as to piece the information of the fingerprint pieces together to form complete fingerprint information;

Determining whether the complete fingerprint information is acquired;

Comparing the complete fingerprint information with the fingerprint information for unlocking the mobile terminal which is stored in advance, and determining whether the complete fingerprint information matches the fingerprint information which is stored in advance, if the complete fingerprint information is acquired;

Locking the mobile terminal, reminding the current operating user that the complete fingerprint information is inconsistent with the fingerprint information for unlocking the mobile terminal which is stored in advance, and prompting the current operating user to re-input fingerprint information to unlock the mobile terminal, if the complete fingerprint information is inconsistent with the fingerprint information for unlocking the mobile terminal which is stored in advance;

Allowing the current operating user to operate the mobile terminal normally if the complete fingerprint information matches the fingerprint information for unlocking the mobile terminal which is stored in advance; and Acquiring and storing the fingerprint information of the current operating user by operating the fingerprint multiplexing button if the complete fingerprint information is not acquired.

In the processing method for piecing together the fingerprint based on the mobile terminal of the present invention, before the step of multiplexing the fingerprint identification area with the button of the mobile terminal to form the fingerprint multiplexing button, and the fingerprint multiplexing button being multiplexed with the finger identification area, the method further comprises:

Recording and storing the fingerprint information for unlocking the mobile terminal which is stored in advance.

A processing method for piecing together a fingerprint based on a mobile terminal comprises:

Multiplexing a fingerprint identification area with a button of the mobile terminal to form a fingerprint multiplexing button, and the fingerprint multiplexing button being multiplexed with the finger identification area;

Acquiring fingerprint information of a user via the fingerprint multiplexing button, and comparing the fingerprint information of the user with fingerprint information which is stored in advance;

Unlocking the mobile terminal if the fingerprint information of the user matches the fingerprint information which is stored in advance;

Acquiring fingerprint information of a current operating user via the fingerprint multiplexing button when the current operating user operates the mobile terminal after the mobile terminal is unlocked;

Comparing the fingerprint information of the current operating user with the fingerprint information which is stored in advance; and Locking the mobile terminal and prompting the current operating user to re-input fingerprint information to unlock the mobile terminal if the fingerprint information of the current operating user is inconsistent with the fingerprint information which is stored in advance.

In the processing method for piecing together the fingerprint based on the mobile terminal of the present invention, after the step of comparing the fingerprint information of the current operating user with the fingerprint information which is stored in advance, the method further comprises:

Allowing the current operating user to operate the mobile terminal normally if the fingerprint information of the current operating user matches the fingerprint information which is stored in advance.

In the processing method for piecing together the fingerprint based on the mobile terminal of the present invention, after the step of acquiring the fingerprint information of the current operating user via the fingerprint multiplexing button when the current operating user operates the mobile terminal after the mobile terminal is unlocked, the method comprises:

Acquiring and storing the fingerprint information of the current operating user by operating the fingerprint multiplexing button, wherein the fingerprint information of the current operating user comprises information of fingerprint pieces;

Comparing the fingerprint information of the current operating user with fingerprint information which is stored during a last time, so as to piece the information of the fingerprint pieces together to form complete fingerprint information;

Determining whether the complete fingerprint information is acquired;

Comparing the complete fingerprint information with the fingerprint information for unlocking the mobile terminal which is stored in advance, and determining whether the complete fingerprint information matches the fingerprint information which is stored in advance, if the complete fingerprint information is acquired;

Locking the mobile terminal, reminding the current operating user that the complete fingerprint information is inconsistent with the fingerprint information for unlocking the mobile terminal which is stored in advance, and prompting the current operating user to re-input fingerprint information to unlock the mobile terminal, if the complete fingerprint information is inconsistent with the fingerprint information for unlocking the mobile terminal which is stored in advance;

Allowing the current operating user to operate the mobile terminal normally if the complete fingerprint information matches the fingerprint information which is stored in advance; and Acquiring and storing the fingerprint information of the current operating user by operating the fingerprint multiplexing button if the complete fingerprint information is not acquired.

In the processing method for piecing together the fingerprint based on the mobile terminal of the present invention, before the step of multiplexing the fingerprint identification area with the button of the mobile terminal to form the fingerprint multiplexing button which is multiplexed with the finger identification area, the method further comprises:

Recording and storing the fingerprint information for unlocking the mobile terminal which is stored in advance.

In the processing method for piecing together the fingerprint based on the mobile terminal of the present invention, the fingerprint multiplexing button is formed by multiplexing a fingerprint sensor in the fingerprint identification area with a home button of the mobile terminal.

A mobile terminal comprises:

A multiplexing control module for controlling to multiplex a fingerprint identification area with a button of the mobile terminal to form a fingerprint multiplexing button, and the fingerprint multiplexing button being multiplexed with the fingerprint identification area;

An unlocking control module for acquiring fingerprint information of a user and comparing the acquired fingerprint information with fingerprint information which is stored in advance, and unlocking the mobile terminal if the fingerprint information of the user matches with the fingerprint information which is stored in advance;

An operating control module utilized for acquiring the fingerprint information of the current operating user via the fingerprint multiplexing button and comparing the acquired fingerprint information of the current operating user with the fingerprint information which is stored in advance when the user operates the mobile terminal after the mobile terminal is unlocked, unlocking the mobile terminal, and prompting the current operating user to re-input fingerprint information to unlock the mobile terminal if the fingerprint information of the current operating user is inconsistent with the fingerprint information which is stored in advance.

The mobile terminal of the present invention further comprises:

A normal operation and process module for allowing the current operating user to operate the mobile terminal normally if the operating control module determines that the fingerprint information of the current operating user matches the fingerprint information which is stored in advance.

In the mobile terminal of the present invention, the operating control module comprises:

An acquiring unit for acquiring and storing the fingerprint information of the current operating user by operating the fingerprint multiplexing button when the current operating user operates the mobile terminal after the mobile terminal is unlocked, wherein the fingerprint information of the current operating user comprises information of fingerprint pieces;

A piecing process unit utilized for comparing the fingerprint information of the current operating user acquired by the acquiring unit with the fingerprint information which is stored during a last time, so as to piece the information of the fingerprint pieces together to form complete fingerprint information;

A determining unit for determining whether the piecing process unit acquires the complete fingerprint information;

A comparing unit for comparing the complete fingerprint information with the fingerprint information for unlocking the mobile terminal which is stored in advance and determining whether the complete fingerprint information matches the fingerprint information for unlocking the mobile terminal which is stored in advance if the determining unit determines that the piecing process unit acquires the complete fingerprint information;

A locking and reminding unit for locking the mobile terminal, reminding the current operating user that the complete fingerprint information is inconsistent with the fingerprint information for unlocking the mobile terminal which is stored in advance, and prompting the current operating user to re-input fingerprint information to unlock the mobile terminal if the comparing unit determines that the complete fingerprint information is inconsistent with the fingerprint information for unlocking the mobile terminal which is stored in advance; and A normal operation unit for allowing the current operating user to operate the mobile terminal normally if the comparing unit determines that the complete fingerprint information matches the fingerprint information for unlocking the mobile terminal which is stored in advance.

The mobile terminal of the present invention further comprises:

A pre-storing module for recording and storing the fingerprint information for unlocking the mobile terminal.

In the mobile terminal of the present invention, the fingerprint multiplexing button is formed by multiplexing a fingerprint sensor in the fingerprint identification area with a home button of the mobile terminal.

Advantageous Effects of the Invention

Advantageous Effects

The processing method for piecing together the fingerprint based on the mobile terminal and the mobile terminal provided by the present invention adopt a way for multiplexing the fingerprint identification area with the button area, such that a new function which multiplexes the fingerprint identification area with the button area is added in the mobile terminal. When the user presses the button area, the trace of the fingerprint of the current operating user is scanned and pieced together. After the complete fingerprint with the key information is acquired, the complete fingerprint is compared with the fingerprint for identification information which is stored in advance. If they are different, the screen of the mobile terminal is locked and the user is prompted to utilize the correct finger for unlocking the mobile terminal, thereby increasing the safety of the information and providing convenience for the user.

BEST EMBODIMENT FOR CARRYING OUT THE INVENTION

Best Mode for Carrying Out the Invention

For a better understanding of the aforementioned content of the present invention, preferable embodiments are illustrated in accordance with the attached figures for further explanation. It should be understood that specific embodiments described herein are merely intended to explain the present invention, but are not intended to limit the present invention.

Figure 1:
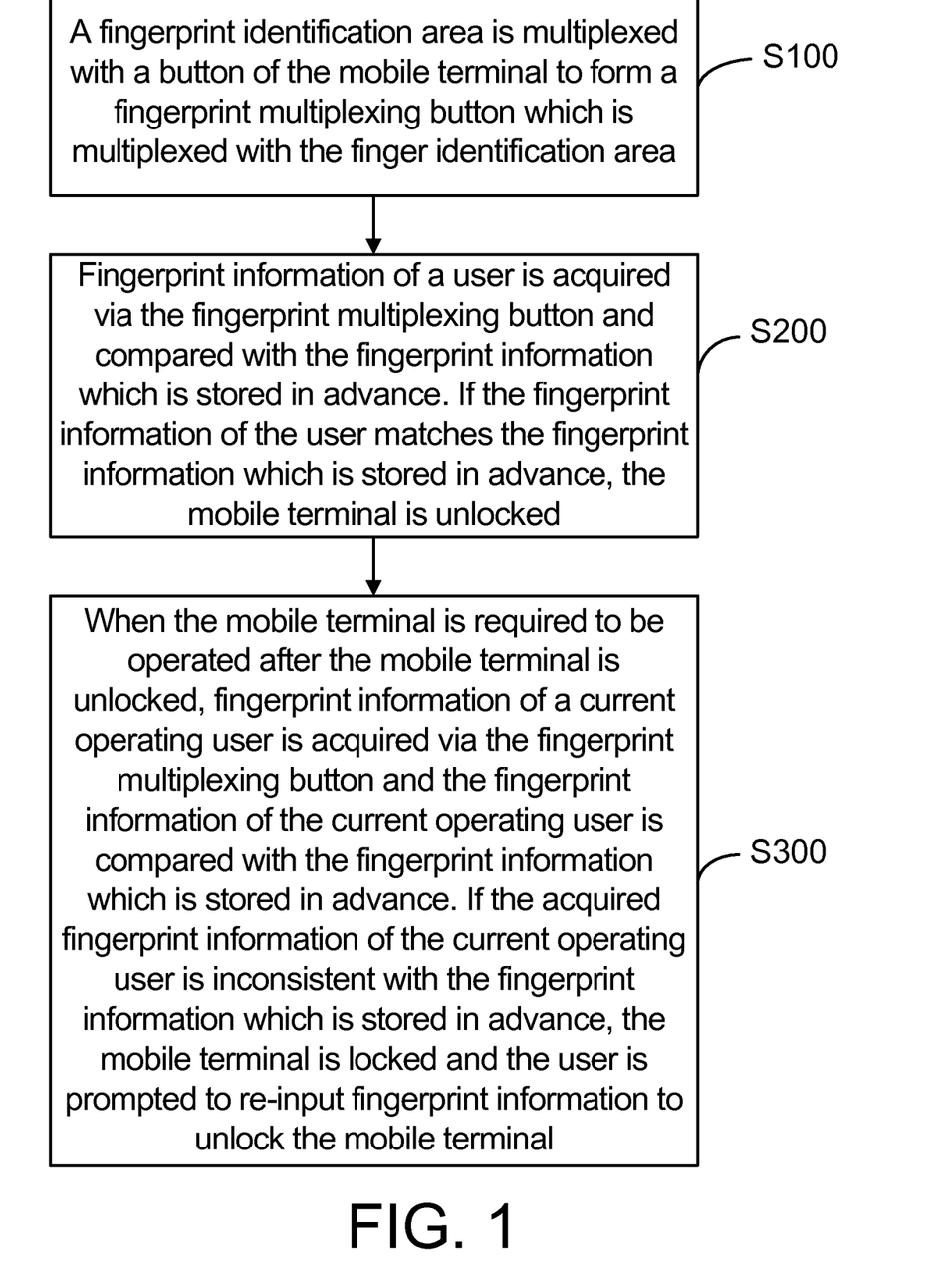
FIG. 1 is a flowchart of a processing method for piecing together a fingerprint based on a mobile terminal in accordance with a preferred embodiment of the present invention.

Please refer to FIG. 1, which is a flowchart of a processing method for piecing together a fingerprint based on a mobile terminal in accordance with a preferred embodiment of the present invention. As shown in FIG. 1, the method for piecing together the fingerprint based on the mobile terminal comprises the following steps.

In step S100, a fingerprint identification area is multiplexed with a button of the mobile terminal to form a fingerprint multiplexing button which is multiplexed with the finger identification area. Preferably, in the present invention, a fingerprint sensor in the fingerprint identification area is multiplexed with a home button of the mobile terminal to form the fingerprint multiplexing button. The fingerprint multiplexing button is multiplexed with the fingerprint identification area. Moreover, fingerprint information for unlocking the mobile terminal is required to be recorded and stored in advance.

In step S200, fingerprint information of a user is acquired via the fingerprint multiplexing button and compared with the fingerprint information which is stored in advance. If the fingerprint information of the user matches the fingerprint information which is stored in advance, the mobile terminal is unlocked.

When the mobile terminal is required to be unlocked, the fingerprint information of the user may be acquired via the fingerprint multiplexing button and compared with the fingerprint information which is stored in advance. If the match is successful, the mobile terminal is unlocked.

In step S300, when the mobile terminal is required to be operated after the mobile terminal is unlocked, fingerprint information of a current operating user is acquired via the fingerprint multiplexing button and the fingerprint information of the current operating user is compared with the fingerprint information which is stored in advance. If the acquired fingerprint information of the current operating user is inconsistent with the fingerprint information which is stored in advance, the mobile terminal is locked and the user is prompted to re-input fingerprint information to unlock the mobile terminal.

If the acquired fingerprint information of the current operating user matches the fingerprint information which is stored in advance, the user is allowed to operate the mobile terminal normally.

That is, in the present embodiment, when the current operating user operates the mobile terminal after the mobile terminal is unlocked successfully, a trace of the fingerprint of the current operating user is scanned to be acquired and compared with the fingerprint information which is stored in advance. If the acquired trace of the fingerprint is inconsistent with the fingerprint which is stored in advance, a screen of the mobile terminal is locked and the user is prompted to re-input fingerprint information to unlock the mobile terminal.

Figure 2:
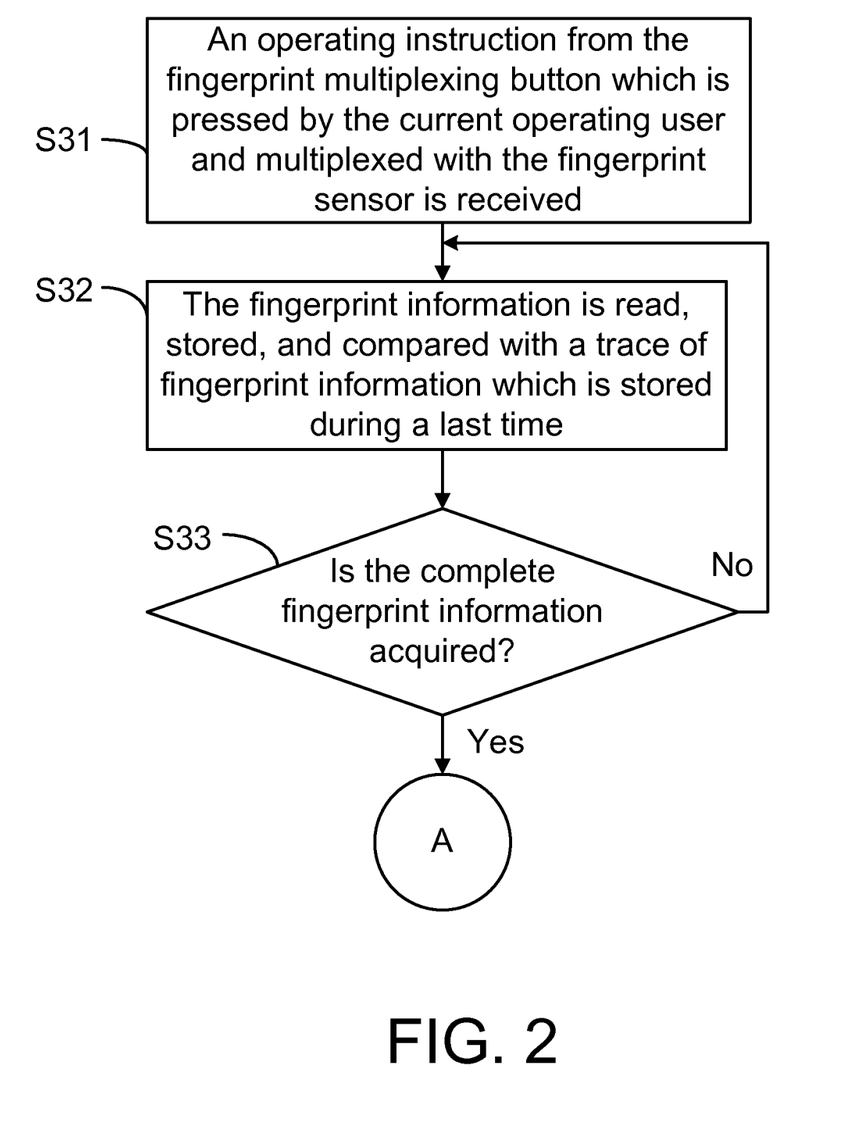
FIG. 2 is a specific flowchart of step S300 of the processing method for piecing together the fingerprint based on the mobile terminal in accordance with an embodiment of the present invention.

Further, step S300 specifically comprises the following steps.

In step S31, an operating instruction from the fingerprint multiplexing button which is pressed by the current operating user and multiplexed with the fingerprint sensor is received. In the present step, when the mobile terminal is required to be operated after the mobile terminal is unlocked, the operating instruction which is pressed by the current operating user and multiplexed with the fingerprint sensor is received. Go to step S32.

In step S32, the fingerprint information is read, stored, and compared with a trace of fingerprint information which is stored during a last time.

That is, in the present invention, when the mobile terminal is required to be operated after the mobile terminal is unlocked, the fingerprint information of the current operating user is acquired and stored by operating the fingerprint multiplexing button. The acquired fingerprint information of the current operating user comprises information of fingerprint pieces. The acquired fingerprint information of the current operating user is compared with the fingerprint information which is stored during the last time, so as to piece the information of the fingerprint pieces together to form complete fingerprint information.

When the user operates to utilize the home button, a background program reads the fingerprint information of the current operating user via a fingerprint identification function. However, the current operating user might utilize a normal function of the home button rather than utilizing the fingerprint identification to implement safety verification. Since the current operating user might operate the mobile terminal faster, the fingerprint sensor might read only the fingerprint pieces. Accordingly, a fingerprint piecing process is required, such that the fingerprint pieces are pieced together to form the complete fingerprint.

In step S33, it is determined whether the complete fingerprint information is acquired. If the complete fingerprint information is acquired, go to step S34. If the complete fingerprint information is not acquired, return to step S32.

That is, the fingerprint piecing process is performed to the fingerprint pieces which are acquired in the operating process, so as to acquire the complete fingerprint information. Then, go to step S34.

In step S34, the acquired complete fingerprint information is compared with the fingerprint information for unlocking the mobile terminal which is stored in advance, and then go to step S35.

In step S35, it is determined whether the acquired complete fingerprint information matches the fingerprint information for unlocking the mobile terminal which is stored in advance. If the acquired fingerprint information is inconsistent with the fingerprint information for unlocking the mobile terminal which is stored in advance, go to step S36. If the acquired fingerprint information matches the fingerprint information for unlocking the mobile terminal which is stored in advance, go to step S37.

In step S36, the mobile terminal is locked, the user is reminded that the acquired complete fingerprint information is inconsistent with the fingerprint information for unlocking the mobile terminal which is stored in advance, and the user is prompted to re-input fingerprint information to unlock the mobile terminal.

In step S37, the user is allowed to operate the mobile terminal normally.

As can be seen from the above, the method of the embodiment of the present invention provides a way for multiplexing the fingerprint identification area with a button area, such that a new function which multiplexes the fingerprint identification area with the button area is added in the mobile terminal. When the user presses the button which multiplexes with the fingerprint identification area in the process of utilizing the mobile terminal, the fingerprint is read and the fingerprint is matched by the background program. If the read fingerprint is inconsistent with the fingerprint which is stored in advance, the mobile terminal is locked for increasing the safety of information.

Figure 3:
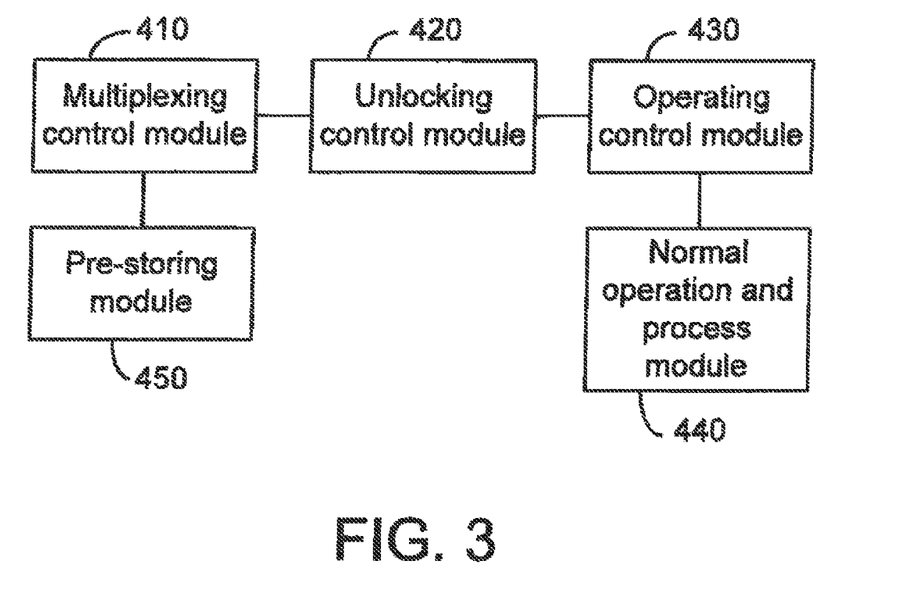
FIG. 3 is the mobile terminal in accordance with a preferred embodiment of the present invention.

Based on the above-mentioned embodiment, the present invention further provides an embodiment of a mobile terminal. Preferably, in the mobile terminal, the fingerprint sensor in the fingerprint identification area is multiplexed with the home button of the mobile terminal to form the fingerprint multiplexing button.

As shown in FIG. 3, the mobile terminal comprises the following modules.

A multiplexing control module 410 is utilized for controlling to multiplex the fingerprint identification area with a button of the mobile terminal to form the fingerprint multiplexing button. The fingerprint multiplexing button is multiplexed with the fingerprint identification area. The embodiment is described above.

An unlocking control module 420 is connected to the multiplexing control module 410 and utilized for acquiring the fingerprint information of the user and comparing the acquired fingerprint information with the fingerprint information which is stored in advance. If the fingerprint information of the user matches the fingerprint information which is stored in advance, the mobile terminal is unlocked. The embodiment is described above.

An operating control module 430 is connected to the unlocking control module 420 and utilized for acquiring the fingerprint information of the current operating user via the fingerprint multiplexing button and comparing the acquired fingerprint information of the current operating user with the fingerprint information which is stored in advance when the user operates the mobile terminal after the mobile terminal is unlocked. If the fingerprint information of the current operating user is inconsistent with the fingerprint information which is stored in advance, the mobile terminal is locked and the user is prompted to re-input the fingerprint information to unlock the mobile terminal. The embodiment is described above.

As shown in FIG. 3, the mobile terminal further comprises:

A normal operation and process module 440 connected to the operating control module 430 and utilized for allowing the user to operate the mobile terminal normally if the operating control module 430 determines that the fingerprint information of the current operating user matches the fingerprint information which is stored in advance. The embodiment is described above.

Furthermore, the mobile terminal further comprises:

A pre-storing module 450 connected to the multiplexing control module 410 and utilized for recording and storing the fingerprint information for unlocking the mobile terminal.

Figure 4:
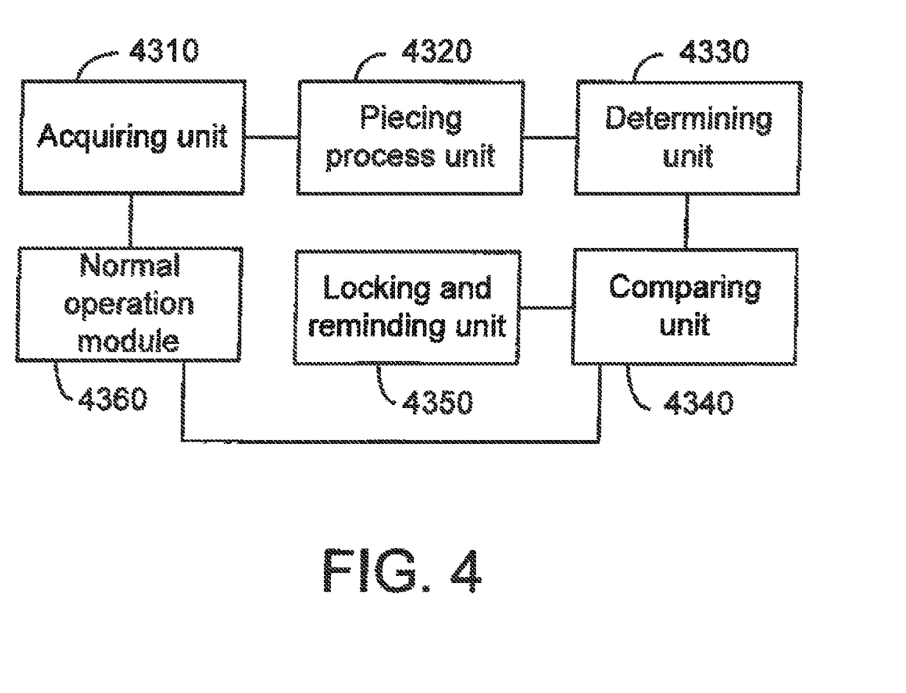
FIG. 4 is an operating control module of the mobile terminal in accordance with a preferred embodiment of the present invention.

As shown in FIG. 4, the operating control module 430 of the mobile terminal specifically comprises the following units:

An acquiring unit 4310, which is utilized for acquiring and storing the fingerprint information of the current operating user by operating the fingerprint multiplexing button when the current operating user operates the mobile terminal after the mobile terminal is unlocked. The fingerprint information of the current operating user comprises the information of fingerprint pieces. The embodiment is described above.

A piecing process unit 4320, which is connected to the acquiring unit 4310 and utilized for comparing the fingerprint information of the current operating user acquired by the acquiring unit 4310 with the fingerprint information which is stored during the last time, so as to piece the information of the fingerprint pieces together to form complete fingerprint information. The embodiment is described above.

A determining unit 4330, which is connected to the piecing process unit 4320 and utilized for determining whether the piecing process unit 4320 acquires the complete fingerprint information. The embodiment is described above.

A comparing unit 4340, which is connected to the determining unit 4330 and utilized for comparing the complete fingerprint information with the fingerprint information for unlocking the mobile terminal which is stored in advance and determining whether the complete fingerprint information matches the fingerprint information for unlocking the mobile terminal which is stored in advance, if the determining unit 4330 determines that the piecing process unit 4320 acquires the complete fingerprint information. The embodiment is described above.

A locking and reminding unit 4350, which is connected to the comparing unit 4340 and utilized for locking the mobile terminal, reminding the user that the complete fingerprint information is inconsistent with the fingerprint information for unlocking the mobile terminal which is stored in advance, and prompting the current operating user to re-input fingerprint information to unlock the mobile terminal if the comparing unit 4340 determines that the complete fingerprint information is inconsistent with the fingerprint information for unlocking the mobile terminal which is stored in advance. The embodiment is described above.

A normal operation unit 4360, which is connected to the acquiring unit 4310 and the comparing unit 4340 and utilized for allowing the user to operate the mobile terminal normally if the comparing unit 4340 determines that the complete fingerprint information matches the fingerprint information for unlocking the mobile terminal which is stored in advance. The embodiment is described above.

In summary, the processing method for piecing together the fingerprint based on the mobile terminal and the mobile terminal provided by the present invention adopt a way for multiplexing the fingerprint identification area with the button area, such that a new function which multiplexes the fingerprint identification area with the button area is added in the mobile terminal. When the current operating user operates the button which multiplexes with the fingerprint identification area, the trace of the fingerprint of the current operating user is scanned and pieced together. After the fingerprint with the complete key information is acquired, it is compared with the previously stored fingerprint for identification information. If the above-mentioned fingerprints are different, the screen of the mobile terminal is locked and the user is prompted to utilize the correct finger for unlocking the mobile terminal, thereby increasing the safety of the information and providing convenience for the user.

As is understood by a person skilled in the art, the foregoing preferred embodiments of the present invention are illustrative rather than limiting of the present invention. It is intended that various modifications and similar arrangements are to be included within the spirit and scope of the appended claims, the scope of which should be accorded the broadest interpretation so as to encompass all such modifications and similar structures.

What is claimed is:

1. A processing method for piecing together a fingerprint based on a mobile terminal, comprising:

forming a fingerprint sharing button, wherein a fingerprint sensor in a fingerprint identification area is shared with a button of the mobile terminal to form the fingerprint button;

acquiring fingerprint information of a user via the fingerprint sharing button;

comparing the fingerprint information of the user with fingerprint information which is stored in advance and utilized for unlocking the mobile terminal;

unlocking the mobile terminal when the fingerprint information of the user matches the fingerprint information which is stored in advance and utilized for unlocking the mobile terminal;

acquiring and storing fingerprint information of a current operating user after the mobile terminal is unlocked and the current operating user presses the fingerprint sharing button, wherein the fingerprint information of the current operating user comprises information of fingerprint pieces;

reading and comparing the fingerprint information of the current operating user with fingerprint information which is stored during a last time after the mobile terminal is unlocked, and then piecing the information of fingerprint pieces together to form complete fingerprint information;

determining whether the complete fingerprint information is acquired;

acquiring and storing the fingerprint information of the current operating user after the current operating user presses the fingerprint sharing button, when the complete fingerprint information is not acquired;

comparing the complete fingerprint information with the fingerprint information which is stored in advance and utilized for unlocking the mobile terminal, and determining whether the complete fingerprint information matches the fingerprint information which is stored in advance and utilized for unlocking the mobile terminal, when the complete fingerprint information is acquired;

locking the mobile terminal, reminding the user that the complete fingerprint information is inconsistent with the fingerprint information which is stored in advance and utilized for unlocking the mobile terminal, and prompting the user to re-input fingerprint information to unlock the mobile terminal, when the complete fingerprint information is inconsistent with the fingerprint information which is stored in advance and utilized for unlocking the mobile terminal; and enabling the current operating user to carry out an operation of the mobile terminal when the complete fingerprint information matches the fingerprint information which is stored in advance and utilized for unlocking the mobile terminal.

2. The processing method for piecing together the fingerprint based on the mobile terminal of claim 1, wherein before the step of forming the fingerprint sharing button, the method further comprises:
recording and storing the fingerprint information for unlocking the mobile terminal in advance.

3. A processing method for piecing together a fingerprint based on a mobile terminal, comprising:
forming a fingerprint sharing button;
acquiring fingerprint information of a user via the fingerprint sharing button;
comparing the fingerprint information of the user with fingerprint information which is stored in advance and utilized for unlocking the mobile terminal;
unlocking the mobile terminal when the fingerprint information of the user matches the fingerprint information which is stored in advance and utilized for unlocking the mobile terminal;
acquiring and storing fingerprint information of a current operating user after the mobile terminal is unlocked and the current operating user presses the fingerprint sharing button, wherein the fingerprint information of the current operating user comprises information of fingerprint pieces;
reading and comparing the fingerprint information of the current operating user with fingerprint information which is stored during a last time after the mobile terminal is unlocked, and then piecing the information of fingerprint pieces together to form complete fingerprint information;
determining whether the complete fingerprint information is acquired; and
acquiring and storing the fingerprint information of the current operating user after the current operating user presses the fingerprint sharing button, when the complete fingerprint information is not acquired.

4. The processing method for piecing together the fingerprint based on the mobile terminal of claim 3, wherein after the step of determining whether the complete fingerprint information is acquired, the method comprises:
comparing the complete fingerprint information with the fingerprint information which is stored in advance and utilized for unlocking the mobile terminal, and determining whether the complete fingerprint information matches the fingerprint information which is stored in advance and utilized for unlocking the mobile terminal, when the complete fingerprint information is acquired;
locking the mobile terminal, reminding the user that the complete fingerprint information is inconsistent with the fingerprint information which is stored in advance and utilized for unlocking the mobile terminal, and prompting the user to re-input fingerprint information to unlock the mobile terminal, when the complete fingerprint information is inconsistent with the fingerprint information which is stored in advance and utilized for unlocking the mobile terminal; and
enabling the current operating user to carry out an operation of the mobile terminal when the complete fingerprint information matches the fingerprint information which is stored in advance and utilized for unlocking the mobile terminal.

5. The processing method for piecing together the fingerprint based on the mobile terminal of claim 3, wherein the fingerprint sharing button is formed by sharing a fingerprint sensor in the fingerprint identification area with the button of the mobile terminal.

6. The processing method for piecing together the fingerprint based on the mobile terminal of claim 3, wherein before the step of forming the fingerprint sharing button, the method further comprises:
recording and storing the fingerprint information for unlocking the mobile terminal in advance.

7. A mobile terminal, comprising:
a computer device; and
a computer-readable memory medium, the computer-readable memory medium comprising codes executable by the computer device, the codes comprising:
a sharing control module configured to cause the computer device to form a fingerprint sharing button, and the fingerprint sharing button being shared with the fingerprint identification area;
an unlocking control module configured to cause the computer device to acquire fingerprint information of a user and to compare the acquired fingerprint information with fingerprint information which is stored in advance and utilized for unlocking the mobile terminal, and to unlock the mobile terminal when the fingerprint information of the user matches the fingerprint information which is stored in advance and utilized for unlocking the mobile terminal;
an operating control module configured to cause the computer device to determine whether fingerprint information of a current operating user via the fingerprint sharing button matches the fingerprint information which is stored in advance and utilized for unlocking the mobile terminal, when the current operating user operates the mobile terminal after the mobile terminal is unlocked, wherein the operating control module comprises:
an acquiring unit configured to cause the computer device to acquire and store the fingerprint information of the current operating user after the mobile terminal is unlocked and the current operating user presses the fingerprint sharing button, wherein the fingerprint information of the current operating user comprises information of fingerprint pieces; and
a piecing process unit configured to cause the computer device to read and compare the fingerprint information of the current operating user with fingerprint information which is stored during a last time after the mobile terminal is unlocked, and then to piece the information of fingerprint pieces together to form complete fingerprint information.

8. The mobile terminal of claim 7, wherein the operating control module further comprises:
a determining unit configured to cause the computer device to determine whether the piecing process unit acquires the complete fingerprint information;
a comparing unit configured to cause the computer device to compare the complete fingerprint information with the fingerprint information which is stored in advance and utilized for unlocking the mobile terminal, and to determine whether the complete fingerprint information matches the fingerprint information which is stored in advance and utilized for unlocking the mobile terminal, when the determining unit determines that the piecing process unit acquires the complete fingerprint information;
a locking and reminding unit configured to cause the computer device to lock the mobile terminal, to remind the user that the complete fingerprint information is inconsistent with the fingerprint information which is stored in advance and utilized for unlocking the mobile terminal, and to prompt the user to re-input fingerprint information to unlock the mobile terminal, when the comparing unit determines that the complete fingerprint information is inconsistent with the fingerprint information which is stored in advance and utilized for unlocking the mobile terminal; and a normal operation unit configured to cause the computer device to enable the current operating user to carry out an operation of the mobile terminal normally when the comparing unit determines that the complete fingerprint information matches the fingerprint information which is stored in advance and utilized for unlocking the mobile terminal.

9. The mobile terminal of claim 8, wherein the fingerprint information of the current operating user is acquired and stored when the determining unit determines that the piecing process unit does not acquire the complete fingerprint information after the current operating user presses the fingerprint sharing button.

10. The mobile terminal of claim 7, wherein the sharing control module is configured to cause the computer device to share a fingerprint sensor in the fingerprint identification area with the button of the mobile terminal to form the fingerprint sharing button.

11. The mobile terminal of claim 7, further comprising:
a pre-storing module configured to cause the computer device to record and store the fingerprint information for unlocking the mobile terminal in advance.

* * * * *